(12) United States Patent
Kane

(10) Patent No.: US 6,488,379 B2
(45) Date of Patent: Dec. 3, 2002

(54) VIDEO PROJECTOR ILLUMINATION SYSTEM USING TWO LAMPS HAVING COMPLEMENTARY BEAMS PATTERNS

(75) Inventor: Robert H. Kane, Ho-Ho-Kus, NJ (US)

(73) Assignee: Phillips Electronics, Eindhoven (NL)

( * ) Notice: Subject to any disclaimer, the term of this patent is extended or adjusted under 35 U.S.C. 154(b) by 0 days.

(21) Appl. No.: 09/834,831

(22) Filed: Apr. 13, 2001

(65) Prior Publication Data
US 2002/0149750 A1 Oct. 17, 2002

(51) Int. Cl.[7] .............................................. G03B 21/26
(52) U.S. Cl. ........................................... 353/94; 355/70
(58) Field of Search .............................. 353/94, 96, 97, 353/98; 355/37, 46, 70; 362/11, 12, 234, 235, 236

(56) References Cited

U.S. PATENT DOCUMENTS

| | | | |
|---|---|---|---|
| 3,078,760 A | 2/1963 | Brownscombe | 88/24 |
| 4,305,099 A | 12/1981 | True et al. | 358/231 |
| 5,669,686 A * | 9/1997 | Moon | 353/94 |
| 5,765,934 A * | 6/1998 | Okamori et al. | 353/38 |
| 6,332,693 B1 * | 12/2001 | Dove et al. | 362/19 |

FOREIGN PATENT DOCUMENTS

| | | | |
|---|---|---|---|
| EP | 0683425 A1 | 11/1995 | G03B/21/10 |
| JP | 6242397 | 9/1994 | G02B/27/18 |

* cited by examiner

Primary Examiner—Russell Adams
Assistant Examiner—D. Ben Esplin

(57) ABSTRACT

An apparatus for providing uniform high efficiency illumination in a projection display system comprising two lamp sources each having a different geometric aligning means. By combining a first light source having an annular cross-sectioned beam and a second light source having a circular cross-sectioned beam sized to be identical to said annulus, a light beam is created that provides more light and greater beam uniformity than has heretofore been available using low cost components.

The annular beam is produced by a first lamp apparatus having a rear spherical reflector and a front parabolic reflector oriented along an optical axis. The circular beam is produced by a second lamp apparatus having a front spherical reflector and a rear parabolic reflector and having an orientation orthogonal to said optical axis. When the two beams are combined at an oval-shaped flat reflector positioned at a 45° angle to the optical axis, a complementary beam is formed which provides a highly efficient and uniformly distributed light source.

21 Claims, 5 Drawing Sheets

VIDEO PROJECTOR ILLUMINATION SYSTEM USING TWO LAMPS HAVING COMPLEMENTARY BEAMS PATTERNS

FIELD OF THE INVENTION

The present invention pertains to the field of illumination devices for projection display systems (e.g. television, cinema, or data display), and more particularly to the application of two light sources having different optical characteristics in projection display systems using liquid crystal light valves.

BACKGROUND OF THE INVENTION

In conventional projectors employing liquid crystal light modulators, a single lamp ordinarily provides the illumination. Typically the lamp consists of a high intensity discharge source in a simple conic reflector, i.e., a paraboloid or an ellipse usually with secondary refractive optics, for reasons of simplicity, cost, and size. The relative small effective éntendue, or optical extent, of the optics in recent projection systems restricts the amount of light which can be collected from the illuminator, and a discharge source is required in most cases to provide sufficient light. As the size of light modulators continues to decrease to reduce system cost, so does the limiting étendue of the optics, hence the more difficult it becomes to increase or maintain screen brightness with conventional illuminators. Conic section reflectors also have the disadvantage that the magnification of the arc image relayed to the projection optics varies with position of the aperture; further, the illumination is usually not uniform across the aperture as a consequence of the radiation patterns from the discharge source. The latter difficulty is usually addressed with the use of optical integrators such as fly-eye arrays, light-pipes, or fiber-optic bundles which superimpose these local intensity patterns at the image plane to provide relatively homogeneous illumination. The former difficulty reduces the light collection; while that may be improved somewhat with radical integrator designs, these may be difficult and expensive to manufacture. At present, light collection is the more pressing issue, but homogeneity is still important Collection from single lamps may be improved by reflector design, and typically is implemented using one of two approaches. In the first, termed "constant magnification", the reflector profile is modified from a parabola or ellipse in such a manner as to develop a constant image size across the aperture. This usually requires auxiliary optics, which may also help homogenize the intensity distribution at the output. See True, et al. and Shimizu. Secondly, one may devise more complex reflectors. True, et al. disclose a compound reflector having an elliptical section with a discharge source at the first focus. Part of the ellipse forward of the first focus is replaced with a spherical reflector segment, the light striking which is reflected back through the discharge tube to the elliptical reflector segment and thence to the second focus. In conjunction with an optional refractive corrector plate, one may utilize large focal lengths in relatively short reflectors. The collection from both of such systems is improved, but limited by the amount of light available from a single source. The constant magnification system of Shimizu, for example, has been shown to improve collection by between 12 and 20% in low-étendue systems over that using a high quality parabolic reflector, each using UHP (ultra-high pressure) short-arc discharge burners.

Multiple light beams may be applied to improve throughput, but since the étendue of each beam is summed together there may be less advantage that expected unless the étendue of the projector optics is large enough to make use of the input. Only for large system étendue will the multiplication of collection be close to the number of sources. For example, if two beams each of area A are superimposed on an aperture also of area A by some optical means, this can only be done if the divergence angle of the resulting beam is doubled; if it is necessary to maintain a small divergence angle, the beams can be combined only in an area approaching 2A.

Techniques for spatial superposition of light beams using reflective and refractive elements to improve projector brightness have been disclosed by, for example, Kokai 5-19355 and 6-242397 and EP683425.

There is the possibility, however, of combining the output of two sources such that the beams do not superimpose, but are principally complementary in space. This approach has the advantages of simplicity, compactness, and low cost since it can be done with inexpensive reflectors and no refractive optical components. It has the additional benefit of providing a better measure of illumination homogeneity across the input aperture of the optical system than that produced by conventional conic-section reflectors.

SUMMARY OF THE INVENTION

Accordingly, the present invention increases the quantity and quality of light beam directed through an aperture of a liquid crystal display projector over the prior art through the use of an apparatus comprising: orthogonally-arranged dual light sources having inexpensive geometric reflectors; and a fixed mirror for combining the beams from the two light sources. A first light source having a spherical rear reflector and a parabolic front reflector produces a light pattern having an annulus (e.g. donut-shaped) at the aperture. A second light source having a parabolic rear reflector and a spherical front reflector produces a complementary circular light pattern which illuminates the dark center of said annulus. Said mirror, having an elliptical shape, is positioned at a 45° angle to the optical axis and centered on both light beams, producing a highly efficient and more uniformly distributed light source.

Another object of the present invention is to provide better beam quality through the use of complimentary beams rather than superimposed beams.

Another object of the present invention is to maximize the amount of light that can be directed through the aperture using the two light source apparatus.

DETAILED DESCRIPTION OF THE DRAWINGS

Figure 1A:
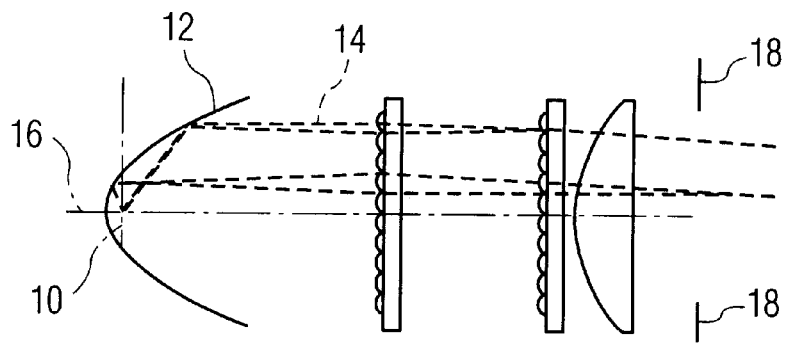
FIGS. 1a–1c show some conventional apparatus for illumination in a video projector.
Figure 1B:
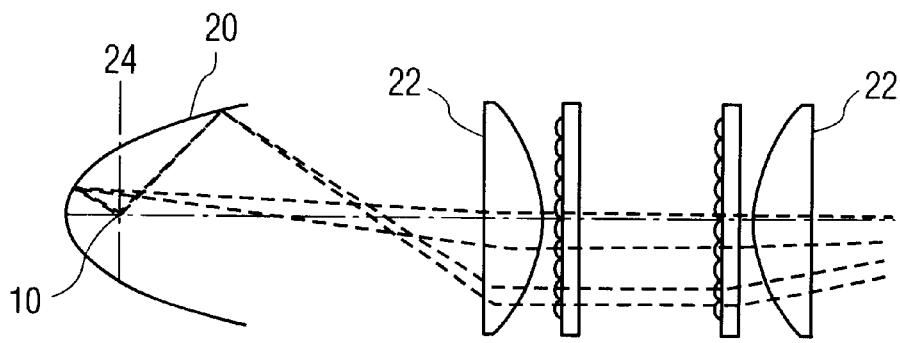

FIGS. 1a and 1b show some conventional apparatus for illumination systems in a video or data/graphics projector. In FIG. 1a, light from a source 10 at the focus of a parabolic reflector 12 produces an output beam 14 that is parallel to an optical axis 16, typically within a few degrees. However, the intensity and angular deviation of beam 14 are not uniform across an aperture 18. The intensity distribution is governed by the radiation pattern of the source, where shadowing of the emission by lamp components, and refraction and/or scattering by the source envelope, typically yields a cylindrical beam with a central obscuration.

The angular distribution of the ray bundles is controlled by the effective size of the source and the well-known aberrations of conic-section reflectors, principally coma. Homogenizing optics, here shown as fly-eye integrator arrays but which might be light pipes, fiber-optic bundles, etc., are normally required. Such optics produce overlapping images of the source at a specified location in the projector and homogenize the intensity distribution reasonably well. The more uniform the input beam, the simpler the integrator optics can be.

In FIG. 1b, an elliptical reflector 20 directs light from source 10 close to a secondary focus, and then to (one or more) lens 22, which collimates the beam. The nature of aberrations and intensity distribution from the combination of reflector 20 and finite source 10 typically requires additional homogenization optics.

Figure 1C:
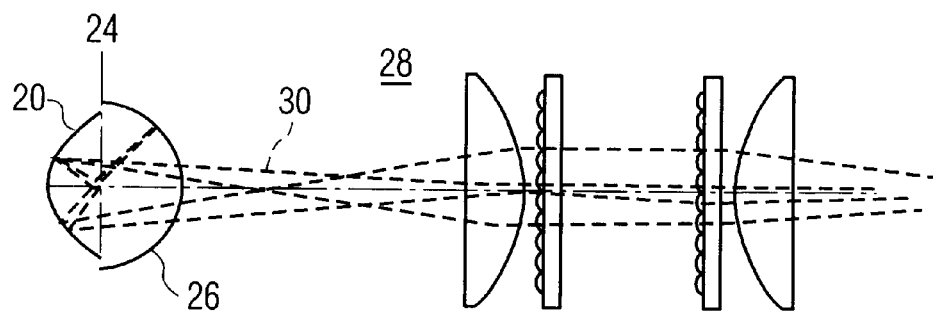

In an alternate embodiment, elliptical reflector 20 may be shortened by truncation at latus rectum 24 and adding a spherical reflector segment 26 having its center at the first elliptical focus to produce an illuminator 28 as shown in FIG. 1c. If spherical segment 26 is truncated along a diameter by latus rectum 24 of ellipse 20, with both segments 20, 26 being full surfaces of revolution, light beam 30 is produced. Illuminator 28 can then be further shortened by proper selection of the first and second focal lengths. The use of compound reflectors has been suggested in the past; see, e.g., U.S. Pat. No. 3,078,760 to P. J. Brownscombe as well as by True, et al.

The illuminator shown in FIG. 1c is similar to the compound reflector according to U.S. Pat. No. 4,305,099, to True and Good. It differs from the teachings of that patent in one critical respect: the design of True and Good prescribes an offset of the two reflector segments such that recycled radiation does not pass through the center of the source, because the discharge in the prescribed lamp is optically dense (i.e., highly absorptive). The optical precision of the reflector is therefore reduced.

In the example shown in FIG. 1c reflector segments 20, 26 are aligned precisely as described above in order that the maximum possible light be allowed to return through the arc to achieve best optical performance. This is possible using an ultra-high pressure mercury discharge (UHP) source, which by nature contains an optically thin discharge.

An alternate embodiment of the illuminator shown in FIG. 1c comprises a compound reflector having a parabolic rather than elliptical rear segment. Light striking the parabolic segment is directed toward the aperture in a substantially parallel fashion. Light striking the spherical segment is re-circulated through the arc to the parabolic reflector and thence in substantially parallel ray bundles. In this case the latus rectum defines the aperture of the parabola, hence the focal length of the parabola can be significantly larger than for a simple reflector of the same aperture size. This is equivalent to increasing the F/number of the reflector which reduces the angular deviation of the output beam.

The angular deviation of the recycled beam is increased slightly, as it will be in the case of an apparatus configured as illuminator 28, but the performance of such a compound reflector represents an improvement over the simple parabola shown in FIG. 1a, as long as the arc source is not excessively absorptive. There will be a central obscuration in the circular beam due to the radiation pattern of the discharge lamp, as described above.

Figure 2:
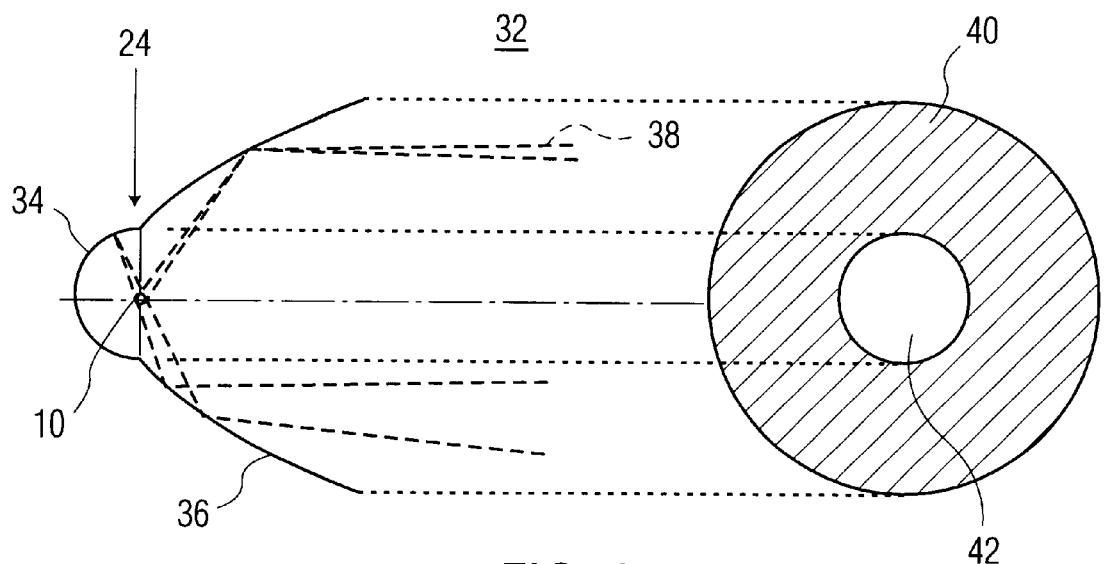
FIG. 2 shows a lamp having reflectors arranged according to one object of the present invention.

FIG. 2 shows an apparatus 32 having reflectors arranged according to one object of the present invention. Arc source 10 is positioned at the center of a hemispherical reflector segment 34 such that rearward-directed radiation is reflected from spherical segment 34 back through source 10 and thence to a paraboloidal segment 36 where it is directed forward as a substantially collimated output beam 38. The paraboloidal segment is sectioned at the latus rectum 24, which lies on the diameter of the hemisphere 34. Source 10 is therefore at both the center of sphere 34 and the focus of paraboloid 36.

As is known in the art, light originating from a point source at the focus of a paraboloid and striking the surface of said paraboloid is subsequently reflected substantially parallel to the axis of the reflector, and the exit beam has insignificant divergence. A beam from practical lamps, however, must necessarily diverge because of the finite extent of real sources. Also, the divergence, or angular magnification, of beams from real lamps decreases with distance from the axis and with increasing focal length of the paraboloid. The beam emerging from a reflector of this design can in some instances be made to have a smaller average divergence angle than the light from a standard parabolic reflector, hence having lower beam étendue. In that case it therefore can be collected more efficiently by the projector optics. Beam 38 produces an annular pattern 40 at the projector aperture.

It will be appreciated that the diameter of spherical segment 34 may have any practical value; it need not be equal to the latus rectum of parabola 36 as shown in the exemplary case shown in FIG. 2. The example given may be the easiest geometry to manufacture since it can be molded precisely in one piece, but there may be optical advantages in using larger spherical radii.

While such compound reflectors improve the collection efficiency of arc output for use in the projection optics, the output light is still restricted by the use of a single lamp. Thus, another object of the present invention is to provide an apparatus comprising two lamps of particular designs and being arranged to increase the light intensity and luminous flux uniformity at the aperture of the projector optics.

More specifically, these lamps are arranged such that an output beam of a first lamp complements the output beam of a second lamp, and the combined light can be accepted by the projector optics such that the total light output exceeds that from a single lamp and reflector.

Figure 3:
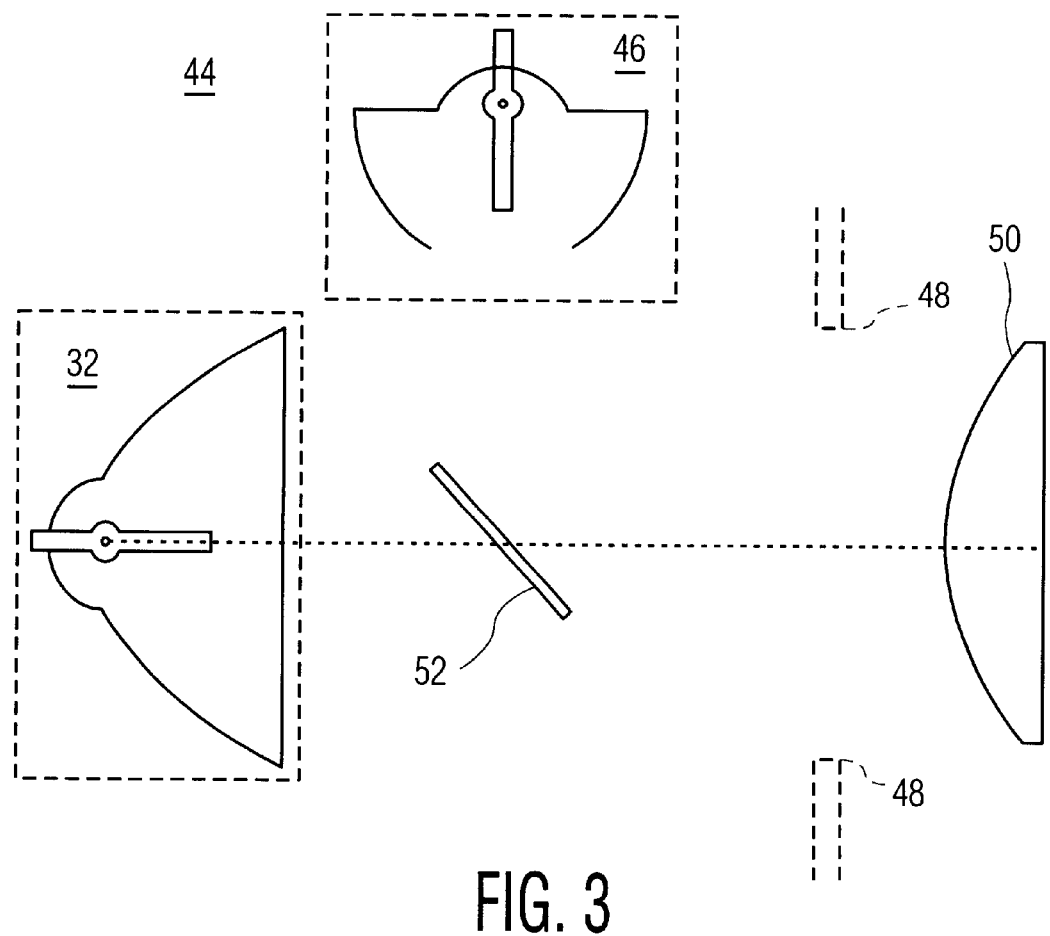
FIG. 3 shows an apparatus for illumination in a video projector using two light sources according the present invention.

Accordingly, FIG. 3 shows an apparatus 44 for illumination in a video projector using said two light sources according to the present invention. Illuminator apparatus 44 combines the light pattern from lamp 32, as shown in FIG. 2, with a second light source 46, which may be similar in concept to lamp 28 shown in FIG. 1c or of other design alone or with additional optical elements providing a beam pattern which fills the central hole 42 in the beam pattern 40 of lamp 32.

Light from lamp 46 is directed toward an aperture 48 and projector optics 50 by an elliptical mirror 52, which is affixed in a permanent manner to a transparent structure 54 such that mirror 48 is positioned in the center of the light beam from lamp 32. The annular beam from source and reflector of lamp 32 passes through transparent structure 54 with little attenuation.

In one embodiment, mirror 52 is deposited on a transparent substrate, coated outside the mirrored area to minimize reflection losses, such that the beam from lamp 32 passes around the mirror 52. In another embodiment, mirror 52 is supported by thin structural members which position mirror 52 while minimizing obscuration of the beam from lamp 32. Elliptical mirror 52 presents a circular target for the beam from lamp 32 and is scaled appropriately to fit in a complementary manner over the dark field of lamp 32 to direct a light beam from lamp 46 to aperture 48. As further explanation, an elliptical mirror oriented at 45 degrees to the optical axis of aperture 48 appears as a circle from the perspective of aperture 48.

FIG. 3 showing lamp 46 as orthogonal to lamp 32, and mirror 52 oriented at 45 degrees to the optical axis is exemplary only. It can be appreciated that other associated angles can be used to direct the circular secondary beam toward the center of aperture 48. A corresponding change in the shape of mirror 52 would also be required to retain the circular perspective from aperture 48. The depiction of lamp 46 is similarly exemplary; the best lamp design for a given system may depart from this, and will depend upon the étendue of the projection optics.

Figure 4:
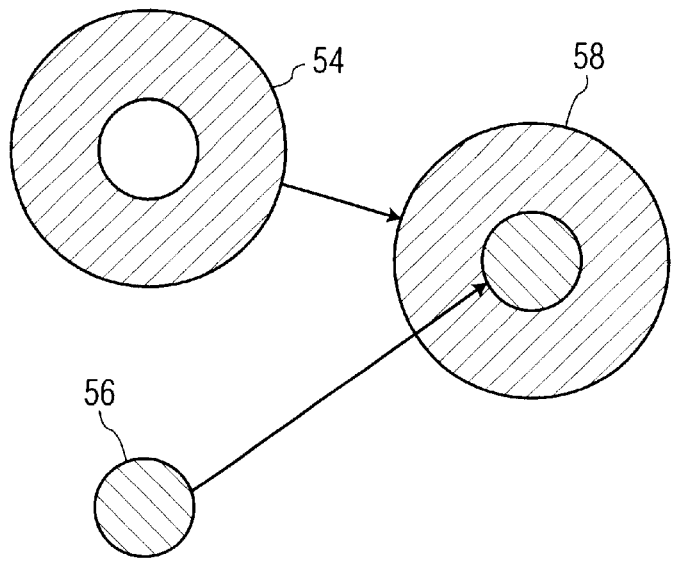
FIG. 4 shows the beam patterns of the two light sources of the apparatus shown in FIG. 3.

FIG. 4 describes the beam patterns of the two exemplary lamps shown in FIG. 3. Beam pattern 54 is generated by lamp 32, forming an illuminated annulus. When pattern 54 is combined with beam pattern 56 from lamp 46 via mirror 52, beam pattern 58 is created and does not include a significant dark field (there may be a small central obscuration due to the radiation pattern of the source which may be absent in some designs).

Figure 5:
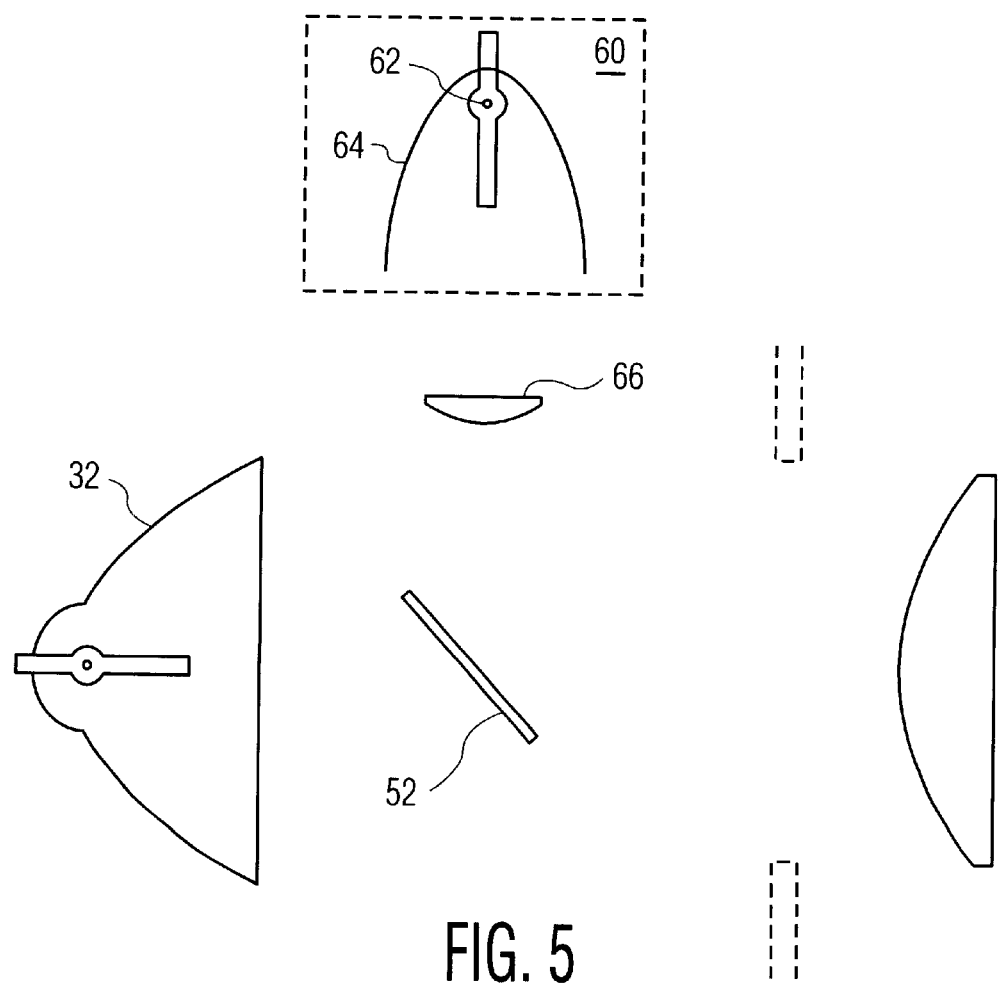
FIG. 5 shows an alternative embodiment of a two-lamp illuminator, wherein the second lamp uses an elliptical reflector and a collimating lens.

FIG. 5 shows a second embodiment of a two-lamp illuminator apparatus, wherein, in conjunction with lamp 32, a second lamp 60 comprises a discharge source 62, an elliptical reflector 64 and one or more refractive elements 66 positioned on the optical axis of lamp 60 beyond the second focal distance of reflector 64 and before mirror 52. Lens 66 improves the beam collimation at mirror 52 as is known in the art. The final lens diameter and position, and the focal distances of the reflector, are selected to maximize light transfer to the projection optics.

Figure 6:
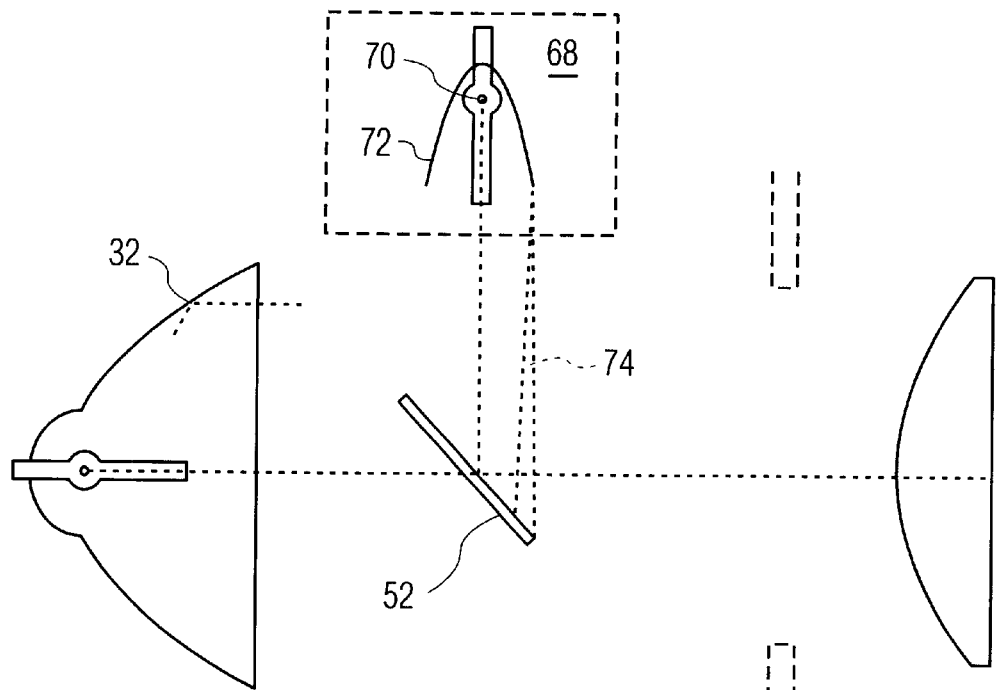
FIG. 6 shows an alternative embodiment of a two-lamp illuminator, wherein the second lamp uses a parabolic reflector.

FIG. 6 shows a third embodiment of a two-lamp illuminator apparatus, wherein, in conjunction with lamp 32, a second lamp 68 comprises a discharge source 70 and a parabolic reflector 72 having an aperture and focal length optimized to maximize light transfer to the projection optics from said source. It will be evident that, because of the radiation pattern 74 of the selected source, the useful output may be maximized in certain circumstances if the lamp aperture is larger than the projection of mirror 52.

Figure 7:
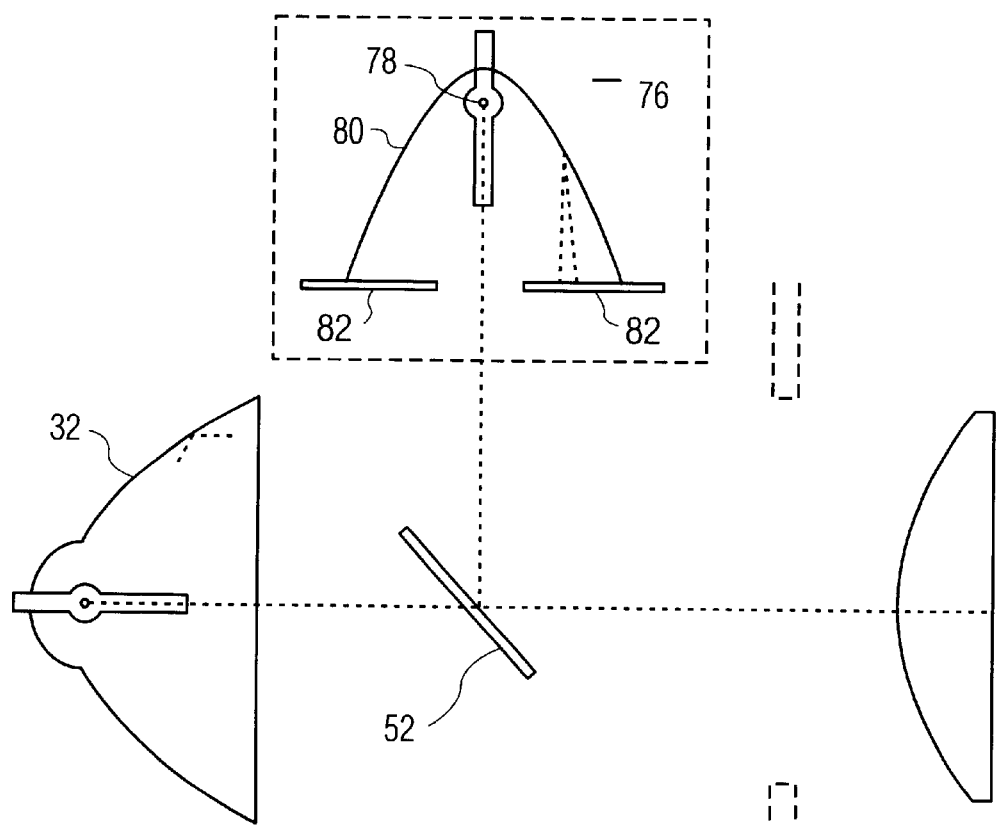
FIG. 7 shows an alternative embodiment of a two-lamp illuminator, wherein the second lamp includes an additional planar mirror.

FIG. 7 shows a fourth embodiment of a two-lamp illuminator apparatus, wherein, in conjunction with lamp 32, a second lamp 76 comprises a discharge source 78, a parabolic reflector 80 having a latus rectum equal to the projected diameter of mirror 52 along the optical axis of lamp 76, and a planar mirror 82 having a transparent area of diameter equal to said latus rectum and centered on said optical axis, the whole positioned outside the reflector aperture. Radiation reaching parabolic reflector 80 rearward of the latus rectum is reflected forward, thence directly through the hole in the planar mirror 82 to mirror 52. Radiation reaching parabolic reflector 80 ahead of the latus rectum is directed forward, is reflected from planar mirror 82 back to parabolic reflector 80, and thence substantially through the source location to the portion of parabolic reflector 80 behind the latus rectum, and finally substantially forward through the hole in planar mirror 82 to mirror 52.

Figure 8:
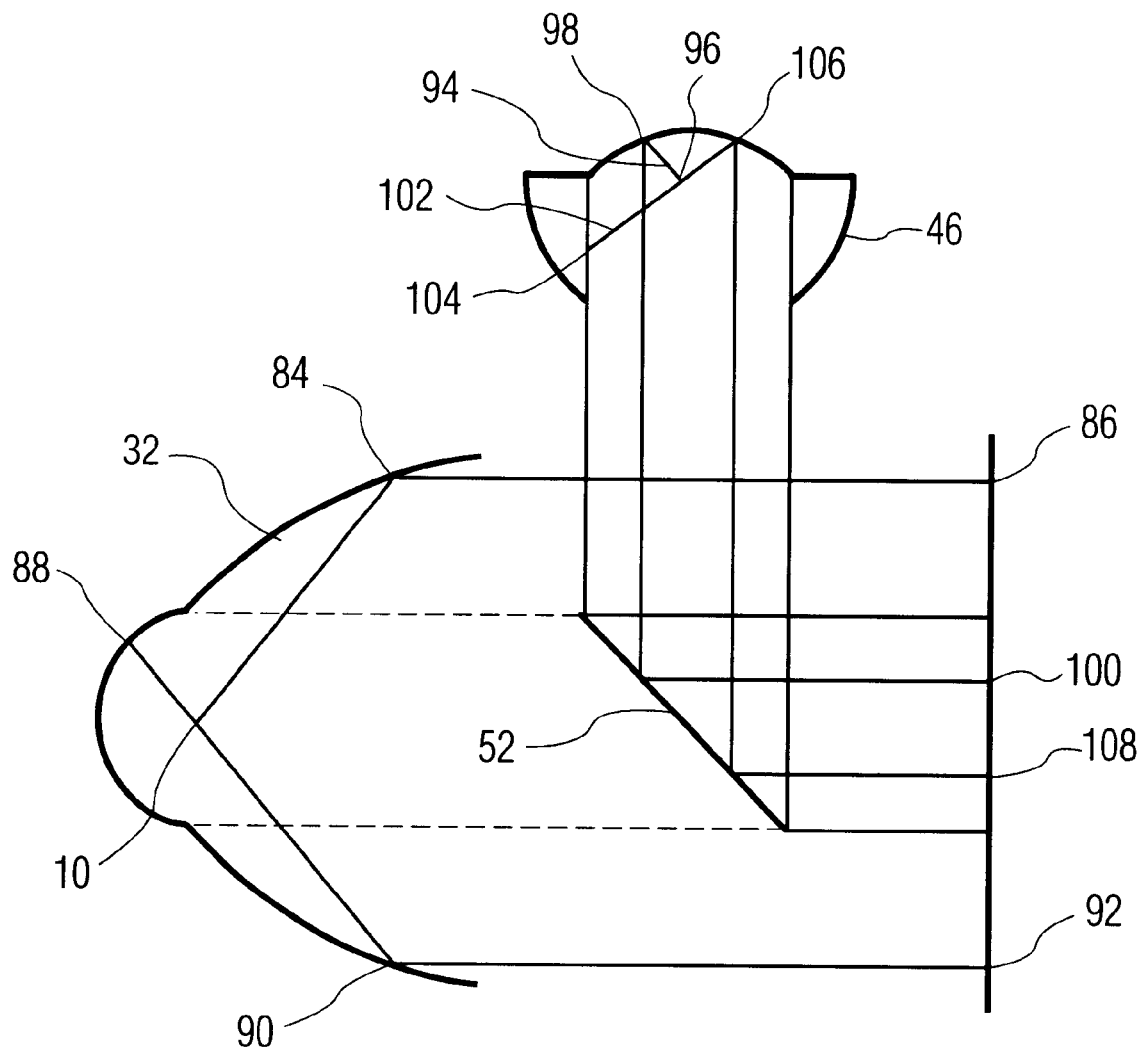
FIG. 8 shows the beam traversal paths of the two light sources of the illuminator shown in FIG. 3.

FIGS. 5 through 7 also show hypothetical beam patterns from exemplary finite sources in the subject reflectors. FIG. 8 shows the idealized beam traversal paths of the two lamps 32 and 46 in the first embodiment. A light beam directed forward of the latus rectum of the reflector of lamp 32 from source 10 reflects at the parabolic surface at point 84 and is directed to aperture point 86. A light beam directed behind the latus rectum of the reflector of lamp 32 from source 10 reflects at the hemispherical surface at point 88 back through source 10 to parabolic surface point 90 and thence to aperture point 92. This adds to the intensity of a forward-directed beam from source 10 to parabolic surface point 90 and thence to aperture point 92.

It can be appreciated that although the shape of the annulus in the exemplary embodiment is circular, it can assume a variety of shapes depending on the specific geometry of the lamp. For alternately shaped embodiments, mirror 52 and the second lamp can be configured to the corresponding shape of the annulus.

Returning to the figure, a rearward-directed light beam 94 from source 96 of lamp 46 reflects at the parabolic surface point 98 and is directed to mirror 52 and then to aperture point 100. A forward-directed beam 102 from source 96 is reflected at circular surface point 104 back through source 96 to parabolic surface point 106 and thence to mirror 52 and aperture point 108. This is added to a rearward-directed beam from source 96 to said parabolic surface point 106 to add to the light intensity at aperture point 108.

The principal objective of the present invention is to increase the luminous flux available to the projection optics, with beam uniformity as a lesser consideration; the use of integrating optics is still envisioned for such illuminators to improve uniformity. The intensities of the beams delivered by each lamp therefore need not be the same. However, it will be appreciated that in certain embodiments of the invention the characteristic output of the second lamp may be adjusted by design or input power control to provide better uniformity, should that become a design objective. Such adjustments of the output characteristics of the second lamp can not be made without taking into account the design and characteristics of the projection optics which follow.

It is an essential feature of the present invention that the dual beams from the first and second lamps are combined in a largely complementary manner rather than being largely superimposed as, for example, in the elliptical reflectors disclosed by Tadachi and dual light sources in a single reflector increase output disclosed by Ikeda in Kokai 6-242397 and Kokai 5-19355, respectively. This complementary aspect can lead to greater usable flux for the projection optics than in approaches that attempt to superimpose beams. This is particularly advantageous when the limiting étendue of the projection optics is small. For example, by using the complementary beams (rather than superpositioned) for a system having an étendue of approximately 12 mm 2-sr, the exemplary embodiments of the present invention can produce available light of approximately 1.75 times that from a similar source in a simple parabolic reflector sized correctly for the system.

In the case of the present invention it is possible to use a reflector producing a low-étendue beam which may not have an ideal pattern or intensity distribution, complementing its output with a second beam of somewhat higher étendue from a second lamp to improve the available luminous flux to the projector optics as well as the total resulting beam pattern and intensity distribution.

As can be seen from the above, the present invention can produce a high quality beam of light without the optical or mechanical complexity of other implementations of dual lamps. Further, combining the fixed mirror 52 and a second lamp 46, 60, 68, or 76 with lamp 32 provides significant improvement in luminous flux, beam quality, system simplicity, reliability, and cost Numerous modifications to and alternative embodiments of the present invention will be apparent to those skilled in the art in view of the foregoing description. Accordingly, this description is to be construed as illustrative only and is for the purpose of teaching those skilled in the art the best mode of carrying out the invention. Details of the embodiment may be varied without departing from the spirit of the invention, and the exclusive use of all modifications which come within the scope of the appended claims is reserved.

What is claimed is:

1. An apparatus for providing illumination in a video projector system comprising:
   a first lamp having a first light source and a first reflective means which produces an illumination pattern that is directed along an optical axis and has an annular beam pattern;
   a second lamp having a second light source and a second reflective means which produces a circular illumination pattern that is directed at a predetermined angle to said axis of the first lamp;
   a flat reflector having a size and shape corresponding to the size and shape of the dark circular space in the annular beam of the first lamp;
   a substantially transparent mounting structure for retaining by an affixing means the flat reflector in the center of a conjunction of the light beams from the first and second light sources, said reflector being oriented at a predetermined angle to said axis of the first lamp such that the illumination pattern of the second light source illuminates dark circular space in the annular beam of the first lamp; and
   an aperture having a plane perpendicular to said axis of the first lamp and to which the two light patterns are directed.

2. The apparatus according to claim 1, wherein the first reflective means comprises a reflector having a spherical-shaped rear portion and a parabolic-shaped front portion, said reflector being oriented along said optical axis.

3. The apparatus according to claim 2, wherein the spherical-shaped rear reflector portion is arranged such that a light beam from the first light source which is incident on the surface of said rear reflector portion is substantially reflected back to said source and thence to the parabolic reflector front portion and finally to said aperture.

4. The apparatus according to claim 2, wherein the parabolic-shaped front reflector portion is arranged such that a light beam from the first light source which is incident on the surface of said front reflector portion is reflected to said aperture.

5. The apparatus according to claim 2, wherein the parabolic-shaped front reflector portion has an optical focus at a spatial location that is substantially identical to the spatial location of the optical focus of the hemispherical-shaped rear reflector portion and with the first light source located substantially at the spatial location of the center of a diameter of the hemispherical reflector portion.

6. The apparatus according to claim 1, wherein the second reflective means comprises a reflector having a spherical-shaped front portion and a parabolic-shaped rear portion, said reflector being oriented along an axis associated with said predetermined angle.

7. The apparatus according to claim 6, wherein the spherical-shaped front reflector portion is arranged such that a light beam from the second light source which is incident on the surface of said front reflector portion is reflected back to said lamp and thence to said rear parabolic reflector portion and thence to an opening in said front reflector portion.

8. The apparatus according to claim 6, wherein the parabolic-shaped rear reflector portion is arranged such that a light beam from the second light source which is incident on the surface of said parabolic reflector portion is reflected to an opening in the spherical-shaped front reflector portion.

9. The apparatus according to claim 6, wherein the parabolic-shaped rear reflector portion has an optical focus at a spatial location which is substantially identical to the spatial location of the optical focus of the spherical-shaped front reflector portion and with the second light source located substantially at the spatial location of the center of a diameter of the hemispherical reflector portion.

10. The apparatus according to claim 1, wherein the first and second light sources each comprise an arc tube, wherein an electrical discharge occurs between two electrodes in a pressurized vessel.

11. The apparatus according to claim 1, wherein the flat reflector has an elliptical shape and is oriented such that it appears circular as viewed from the perspective of said aperture.

12. The apparatus according to claim 1, wherein the flat reflector has a size that is identical to the size of the un-illuminated region in the annular illumination pattern produced by the first lamp as viewed from the perspective of said aperture.

13. The apparatus according to claim 1, wherein the affixing means comprises a mechanical bonding agent or process applied at a plurality of common connecting points between the mirror and the transparent mounting structure.

14. The apparatus according to claim 1, wherein the flat reflector is a highly reflective coating of said size and shape, and said mounting structure is a thin transparent planar substrate for said coating, said substrate outside the mirror area being treated with an anti-reflection coating to minimize reflection losses and said reflective coating being applied to the side of said substrate facing toward said second lamp, with said substrate extending outside the aperture of said first lamp.

15. The apparatus according to claim 1, wherein the second light source has an illumination energy that is less than an illumination energy of the first light source.

16. The apparatus according to claim 1, wherein the orientation angle of the flat reflector is 45 degrees relative to the optical axis of the first light source.

17. The apparatus according to claim 1, wherein the illumination patterns of said first and second light sources are complementarily joined at said aperture such that neither beam substantially superimposes the other.

18. The apparatus according to claim 1, wherein the energy density of the light passing through said aperture is substantially uniform and substantially collimated.

19. The apparatus according to claim 1, wherein the second reflective means comprises a parabolic reflector, said reflector having a focal length and aperture sized according to the characteristics of said second source to maximize the amount of luminous flux on said flat reflector.

20. The apparatus according to claim 1, wherein the second reflective means comprises a parabolic reflector having a latus rectum equal to the projected diameter of said mirror and an aperture diameter substantially larger than the latus rectum with a second light source to be located at the focus of the parabola, said reflector having an aperture diameter substantially larger than the latus rectum, and a planar mirror arranged outside the aperture of said reflector and perpendicular to the optical axis of said reflector having a transparent circular region centered on the said optical axis of diameter equal to the latus rectum of said parabolic reflector.

21. The apparatus according to claim 1, wherein the second reflective means comprises an elliptical reflector in conjunction with at least one lens arranged along the optical axis of said reflector, the characteristics of said reflector and said lens being selected to maximize the luminous flux and degree of collimation of the light beam at said flat reflector produced by said second source.

* * * * *

UNITED STATES PATENT AND TRADEMARK OFFICE
CERTIFICATE OF CORRECTION

PATENT NO.   : 6,488,379 B2                                              Page 1 of 1
DATED        : December 3, 2002
INVENTOR(S)  : Robert H. Krane It is certified that error appears in the above-identified patent and that said Letters Patent is hereby corrected as shown below:

<u>Title page,</u>
Item [73], Assignee, change "Phillips Electronics" to -- Koninklijke Philips Electronics N.V. --.

Signed and Sealed this

Twenty-ninth Day of April, 2003

JAMES E. ROGAN
*Director of the United States Patent and Trademark Office*